Figure 4:
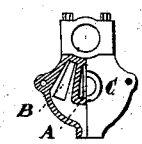

C. V. WYSS & H. STUDER.
Motive-Power Engine.

No. 162,785.	Patented May 4, 1875.

Witnesses.
Harry C Clark
James J. Finley

Inventors.
Conrad V Wyss and
Henry Studer
By R. W. Beadal & Co.
Attys.

THE GRAPHIC CO. PHOTO-LITH. 39 & 41 PARK PLACE, N.Y.

UNITED STATES PATENT OFFICE.

CONRAD V. WYSS AND HENRY STUDER, OF ZURICH, SWITZERLAND.

IMPROVEMENT IN MOTIVE-POWER ENGINES.

Specification forming part of Letters Patent No. 162,785, dated May 4, 1875; application filed July 14, 1874.

*To all whom it may concern:*

Be it known that we, CONRAD V. WYSS and HENRY STUDER, both of Zurich, Switzerland, have invented an Improved Motive-Power Engine, to be operated by the pressure of water, steam, or compressed air, and capable of use as a pump-blowing engine or gas-exhauster, of which the following is a specification:

This engine is designed chiefly for working machinery hitherto driven by manual labor in towns and other industrial places where steam-power is either too expensive or prohibited because of its danger and other inconvenience.

The introduction of water-works and conduits with high-pressure water for the domestic supply of towns has made it desirable to obtain a convenient motive-power for driving lithographic and printing presses, wood and iron working machinery, pumps for distillery purposes, hoists, and other machinery not requiring very great power. Its application is, however, not limited to town industries, but may be used advantageously in larger proportions for natural falls of water from twenty meters upward, at least where the water does not contain pebbles or rough sand. It may, further, be applied for raising and forcing liquids, such as sewage, for cleaning pits, as fire-pumps, or for contractors' purposes.

The cylinder of this improved engine is oscillating, deriving its motion in the ordinary way by the crank being directly connected to the head of the piston-rod and being supported on its trunnions by fixed bearings cast in one piece, and thereby directly connected with the crank-shaft bearings. These two double bearings are bolted firmly upon a strong foundation-plate, supporting also the air-vessel on its after part. They are further connected by two stays, as shown. The cylinder bears at both right and left sides flat faces turned and adjusted truly rectangular to the axis of its trunnions. Into these faces open the ports of the two water-passages contained in the lower part of the cylinder-body, communicating at their other ends with the bore of the cylinder. Adjusted truly to them, and so held up as to be easy but tight against the said cylinder-faces, are two boxes, one at each side, which receive in the first place the water from the conduits and distribute it by corresponding ports contained in their faces alternatively to the two cylinder-ports, and consequently fore and aft of the piston, causing the same to reciprocate, guided by the crank. A fly-wheel is provided to overcome the dead-points which occur at each end of the stroke. The water which has performed its work is expelled by the returning piston back through its passage, and enters the above-named boxes through two separate ports to the right and left of the admission-port, whence it flows through suitable conduits to the drain-pipe, into the sewer or other receptacle, whence it may be used again.

Figure 2:
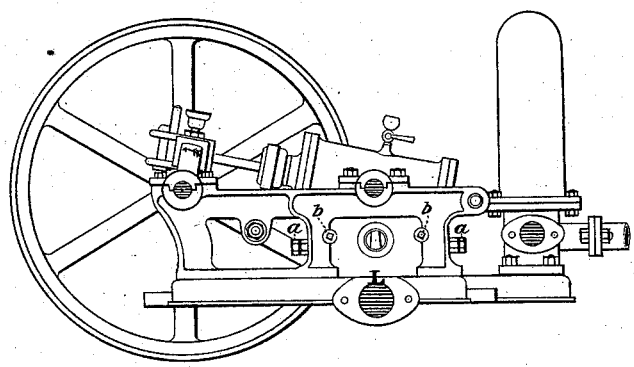
Figure 3:
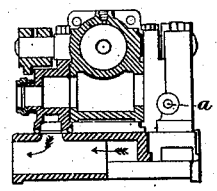
Figure 1:
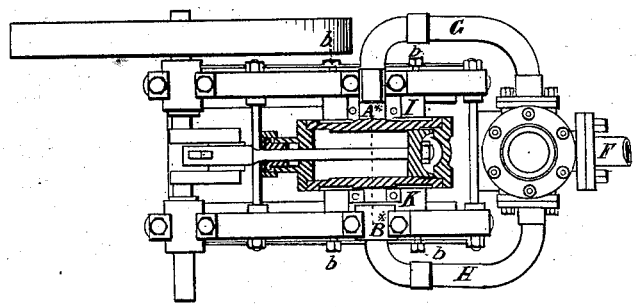
Figure 5:
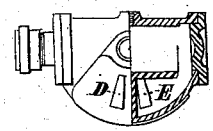
Figure 5:
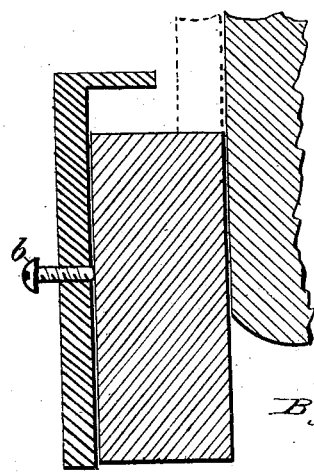

Figure 1 is a plan, partly in horizontal section, of an engine constructed according to this invention. Fig. 2 is a side elevation of the same. Fig. 3 is partly an end elevation and partly a transverse section on the line A* B*, Fig. 1. Figs. 4 and 5 show portions of the said engine detached.

Like letters indicate the same parts throughout the drawings.

A is the admission-port in the distribution-box, which admits the water alternatively to the cylinder-ports D E. Supposing E to be in correspondence with A, as in the drawings, D corresponds with the exhaust-port B in the box. From this position the piston now moves from right to left, expelling the exhaust-water through D and B, and down through the opening L, which is common to both B and E into any suitable conduit leading to the drain. On the return of the piston the like action takes place in the opposite direction. The screws $a$ are for the purpose of setting and fixing the boxes I K in their proper positions in reference to the cylinder-ports. By means of the set-screws $b$ they are screwed slightly up to the cylinder to make a tight joint between their faces, and still allow of free motion of the cylinder between the boxes.

If the engine is used as a water-pressure engine, the water under pressure enters at F and divides beneath the air-vessel in two branches, G H, which are made, in preference, of india-rubber hose. The air-vessel is then placed at any suitable distance from the machine—that is to say, it is not necessary it should stand on the bed-plate. The said two branches conduct the water to the two boxes I K, and through them into the cylinder, and through the same to the drain, as before described.

If the engine is used as a steam or air motor, the air-vessel is, of course, omitted, and the branches I K made of copper, the other parts being the same as above described.

If the said invention is to be used as a pump, the suction-pipe is attached at L and the delivery-pipe at F, the machine moving in reversed direction, driven by a belt or by manual labor.

In the application of this invention as a steam-pump two engines are connected in opposite direction, their piston-rods being attached to one crank. One cylinder receives steam and imparts its motion to the other, which acts as the pump.

The ports and passages may be made of any section required to suit the purposes to which the said invention is to be applied, by increasing or diminishing the length of radius of the ports and passages.

In any case two such engines may be placed side by side, the cranks being then coupled at right angles to avoid dead-points.

By retaining the same area of ports and passages, and without increasing the frictional faces, the stroke of the piston may be increased to any convenient extent, thereby reducing the number of revolutions, with the same relative piston-speed. The advantage of this is apparent in the reduction of the strain in conduits resulting from the cut-off at the dead-points twice in every revolution.

By the employment of elastic pipes in the two branches leading from the air-vessel to the cylinder these strains are further reduced, these pipes yielding under the internal stress to some extent, and consequently diminishing them and allowing them to be taken up more easily by the air-vessel. The avoidance of these strains, which produce an unpleasant knocking noise, is of great importance, as they are produced at the expense of the useful effect of the water-power. No friction exists between the sliding faces of the cylinder and its distribution-boxes—that is to say, a balanced pressure exists between them by reason of the set-screws $b$ being tightened up exactly to the amount of the water-pressure, tending to force the boxes off the cylinder. This balancing taking place from right and left, there is no kind of friction brought upon the cylinder other than that due to the thrust of the piston, and resisted by the cylinder in its journals.

The frictional faces being flat and the ports cut squarely to them, they can at any time be readjusted in case they should wear on account of impure water. The pitch of the ports remaining unaltered with returning faces, which is totally different with machines of curved faces underneath the cylinder, the facilities for lubricating these faces are so far greater than in other engines that no part of the said improved engine has to be lifted bodily up to allow access to them; all that is required is to slacken the set-screws $b$, to allow the lubricating fluid being poured in between the faces, while every facility is afforded for taking all parts to pieces for thorough cleaning. Furthermore, the said improved engine possesses the advantages of the greatest possible solidity and facility of construction and repairs, the absence of any kind of valves, and its adaptability for various purposes, combined with the possibility of cheap construction, facility of erection, and its very slight want of attention when working, and the exceedingly high useful effect, which is within eight per cent. near the power contained in the water-column.

We claim as our invention—

The combination of a cylinder provided with a projecting valve-chamber, as shown in Fig. 5, the fixed distribution-boxes located one upon each side and adapted to distribute the actuating-fluid equally and simultaneously upon each side, substantially as and for the purpose as described.

CONR. V. WYSS.
HENRY STUDER.

Witnesses:
H. J. NOONE,
JAS. EDWARDS.